United States Patent
Weissbach et al.

(10) Patent No.: US 9,787,229 B2
(45) Date of Patent: Oct. 10, 2017

(54) METHOD OF OPERATING A SINGLE-STRANDED ELECTRONICALLY COMMUTATED MOTOR FROM A DC VOLTAGE SOURCE, AND MOTOR FOR CARRYING OUT SUCH A METHOD

(75) Inventors: Henry Weissbach, Uhlingen-Birkendorf (DE); Arnold Kuner, St. Georgen (DE); Jens Loeffler, St.Georgen-Brigach (DE)

(73) Assignee: EBM-PABST ST. GEORGEN GmbH & Co. KG, St. Georgen (DE)

( * ) Notice: Subject to any disclaimer, the term of this patent is extended or adjusted under 35 U.S.C. 154(b) by 0 days.

(21) Appl. No.: 12/253,325

(22) Filed: Oct. 17, 2008

(65) Prior Publication Data
US 2017/0257042 A1    Sep. 7, 2017

Related U.S. Application Data

(63) Continuation-in-part of application No. PCT/EP2007/004844, filed on Jun. 1, 2007.

(51) Int. Cl.
*H02P 6/00* (2016.01)
*H02P 6/08* (2016.01)
(Continued)

(52) U.S. Cl.
CPC ............ *H02P 6/085* (2013.01); *H02M 1/084* (2013.01); *H02M 7/219* (2013.01); *H02P 6/15* (2016.02)

(58) Field of Classification Search
CPC ........ H02P 2209/07; H02P 6/14; H02P 6/085; H02P 6/18; H02P 5/68; H02P 6/08; H02P 6/15; H02P 6/181; H02P 6/26; H02P 6/28
(Continued)

(56) References Cited

U.S. PATENT DOCUMENTS

| 3,840,761 A | 10/1974 | Muller | 310/49 R |
| 3,873,897 A | 3/1975 | Muller | 310/138 |

(Continued)

FOREIGN PATENT DOCUMENTS

EP    1346462    9/2003

*Primary Examiner* — Paul Ip
(74) *Attorney, Agent, or Firm* — Milton Oliver; Oliver Intellectual Property

(57) ABSTRACT

An electronically commutated motor is operated from a DC voltage source ($U_B$), e.g. from a DC link circuit (46). The motor has a permanent-magnet rotor (28) and a stator having a stator winding strand (26) in which, during operation, an alternating voltage is induced by the permanent-magnet rotor (28). It further has an H-bridge circuit (22) having power semiconductors (T1 to T4). At the beginning of a commutation operation, the presently conductive semiconductor switch of a first bridge half (38) is switched off, in order to interrupt energy delivery from the DC voltage source ($U_B$), so that, in the other bridge half (56), a loop current (i*; −i*) flows through the stator winding strand (26), through the semiconductor switch still controlled to be conductive therein, and through a recovery diode (58; 60) associated with the blocked semiconductor switch of that other bridge half. This loop current converts the energy stored in the magnetic circuit of the motor (20) at least partly into driving energy for the permanent-magnet rotor (28), and in that context the stored energy drops to zero. This currentless state of the stator winding strand (26) is detected in a sensorless manner by measuring the voltage ($u_{ind}$) induced by the rotor (28) in the stator winding strand (26).

26 Claims, 15 Drawing Sheets

(51) Int. Cl.
*H02P 6/15* (2016.01)
*H02M 7/219* (2006.01)
*H02M 1/084* (2006.01)

(58) Field of Classification Search
USPC .................. 318/139, 400.03, 400.26, 400.29
See application file for complete search history.

(56) References Cited

U.S. PATENT DOCUMENTS

| | | | | |
|---|---|---|---|---|
| 4,376,261 | A | 3/1983 | von der Heide et al. | 310/254 |
| 5,696,430 | A | 12/1997 | Erdman | 310/254 |
| 6,008,602 | A | 12/1999 | Karwath | 318/254 |
| 6,049,184 | A | 4/2000 | Uggla | 318/434 |
| 6,452,349 | B1 | 9/2002 | Hahn | 318/254 |
| 6,825,627 | B2 * | 11/2004 | Berroth | H02P 6/14 318/139 |
| 6,906,484 | B1 | 6/2005 | Berroth et al. | 318/434 |
| 6,906,486 | B2 * | 6/2005 | Berroth | H02P 6/085 318/400.29 |
| 6,940,243 | B2 * | 9/2005 | Berroth | H02P 6/085 318/400.29 |
| 6,943,517 | B2 | 9/2005 | Yoshitomi et al. | 318/471 |
| 6,956,343 | B2 * | 10/2005 | Berroth | H02P 6/15 318/400.03 |
| 7,002,307 | B2 | 2/2006 | Yoshitomi et al. | 318/254 |
| 7,268,502 | B2 * | 9/2007 | Dornhof | H02P 5/68 318/400.38 |
| 7,902,776 | B2 * | 3/2011 | Karwath | H02P 6/18 318/400.07 |
| 8,604,726 | B2 * | 12/2013 | Hogg | H02P 6/08 318/139 |
| 2004/0027084 | A1 * | 2/2004 | Berroth | H02P 6/14 318/400.29 |
| 2004/0027085 | A1 * | 2/2004 | Berroth | H02P 6/15 318/400.29 |
| 2004/0036435 | A1 * | 2/2004 | Berroth | H02P 6/085 318/400.26 |
| 2004/0051489 | A1 * | 3/2004 | Berroth | H02P 6/085 318/400.29 |
| 2006/0125431 | A1 * | 6/2006 | Dornhof | H02P 5/68 318/85 |
| 2007/0241705 | A1 * | 10/2007 | Karwath | H02P 6/18 318/400.29 |
| 2010/0259203 | A1 * | 10/2010 | Hogg | H02P 6/08 318/139 |

* cited by examiner

METHOD OF OPERATING A SINGLE-STRANDED ELECTRONICALLY COMMUTATED MOTOR FROM A DC VOLTAGE SOURCE, AND MOTOR FOR CARRYING OUT SUCH A METHOD

FIELD OF THE INVENTION

The present invention relates to a method of operating a single-stranded electronically commutated motor from a DC voltage source, and to a motor for carrying out such a method.

BACKGROUND

There are various designs for electronically commutated motors. One known classification system is based on the number of current pulses delivered to the stator winding of such a motor for each rotor revolution of 360° el. A distinction can therefore be made between one-pulse motors, in which only a single driving current pulse is delivered during one rotor revolution of 360° el.; two-pulse motors, in which two stator current pulses, which are usually spaced apart in time from one another, are delivered during one rotor revolution of 360° el.; and also three-pulse, six-pulse, etc. motors.

Such motors are further classified according to their number of stator winding strands, i.e. as single-stranded, double-stranded, triple-stranded motors, etc.

For complete definition of a design, the number of stator winding strands and the number of pulses per 360° el. must therefore be indicated, e.g. a single-stranded, two-pulse motor. Borrowing from the terminology of motors that are operated with alternating or three-phase current, two-pulse motors are also referred to as single-phase motors; a single-phase motor can therefore have either one or two winding strands.

In order to control the current in its stator winding strand, a single-stranded motor usually has a bridge circuit in the form of a so-called H bridge in whose transverse connection (or "diagonal") the winding strand (e.g. winding strand 26 in FIG. 1) is arranged. By appropriate control of bridge circuit 22, the current in the winding strand is controlled so as to produce current pulses that flow through said winding strand 26 alternately in one direction and then in the opposite direction. Between each two such current pulses there is a reversal of the current direction, which is referred to in electrical engineering as a "commutation."

The motor usually has a permanent-magnet rotor, and the current pulses in winding strand 26 generate magnetic fields which drive said rotor. The torque generated electromagnetically in this fashion has gaps, and these are spanned by an auxiliary torque, e.g. a mechanical auxiliary torque or a so-called reluctance torque; cf. for example DE 23 46 380 C2 and corresponding U.S. Pat. No. 3,873,897, Müller, issued Mar. 25, 1975. There are an almost infinite number of ways to generate such an auxiliary torque.

Motors of this kind are usually operated from a DC voltage source, e.g. from a battery, a power supply, or a rectifier that rectifies the voltage of an alternating or three-phase power network and delivers it to a DC link circuit from which the motor is supplied with DC voltage. A capacitor, referred to as a link circuit capacitor, is usually connected to this link circuit.

When current flows through a winding strand, energy is stored in it in the form of a magnetic field. If the inductance in such a strand is designated L, and the current I, this energy can be calculated using the formula $$W = 0.5 * L * I^2 \tag{1}$$

If the current direction in a winding strand is to be reversed (i.e. "commutated") in order to generate a circulating magnetic field, this stored energy must first be reduced.

When energy delivery to a current-carrying winding strand is switched off, the effect of so-called self-induction at that winding strand is to cause a voltage rise that is brought about by the stored magnetic energy. Very high voltages can be caused as a result. Semiconductor switches having high dielectric strength must therefore be used.

A certain improvement can be achieved by using a link circuit capacitor, which serves to receive, in the form of electrical energy, the magnetic energy stored in the winding strand, and thereby to limit the voltage that occurs at the motor's DC link circuit. This capacitor therefore receives energy during operation and then immediately discharges it again; in other words, a current, also referred to as a "ripple current," continuously flows in the supply leads of this capacitor during operation.

In terms of material costs, capacitors of this kind represent an economical solution to the aforementioned problem, but relatively large capacitors—usually so-called electrolyte capacitors—are required; their service life is limited, and is additionally reduced by the considerable heating that is caused by the ripple current. This decrease in the service life of the capacitor consequently limits the motor's service life, which could be substantially longer as far as the motor's mechanical elements are concerned. In addition, in smaller motors there is usually not sufficient space for an electrolytic capacitor, and such capacitors must be expensively soldered in by hand, while the other components can be soldered automatically.

A further possibility for limiting the voltage spikes that occur when a winding strand is switched off is to use a Zener diode or, when a FET (Field Effect Transistor) power stage is utilized, to exploit the so-called avalanche energy. Here the energy that is stored upon shutoff in the winding strand that is to be switched off is converted into heat in the aforesaid semiconductor elements. From the viewpoint of the semiconductor elements that are used, this is dissipated power, and components of appropriate performance must therefore be used.

The energy converted into heat is also "lost" and can no longer be used to drive the rotor, i.e. the efficiency of such a motor is lower.

SUMMARY OF THE INVENTION

It is therefore an object of the present invention to make available a novel method for operating a single-stranded electronically commutated motor, as well as a novel motor for carrying out such a method.

According to a first aspect of the invention, this object is achieved by blocking, in one bridge half, the presently conductive semiconductor switch to interrupt energy delivery from the DC voltage source, thereby causing a loop current to flow through the stator winding strand in the other bridge half and converting energy stored in the magnetic circuit of the motor into driving energy for the rotor, monitoring voltage at the stator winding strand to ascertain when the loop current declines to a predetermined level, and completing commutation by causing current to flow through the stator winding strand in a direction which is opposite to the direction of current flow prior to the commutation. In the context of the invention, a commutation operation profile is used in which, at least once normal rotation speed is reached, the energy content of the winding strand being used is practically equal to zero upon reversal of the current direction, so that no ripple current occurs. This enables the use of a small link circuit capacitor that has a long service life and requires little space in the motor. In some cases, such a capacitor can even be entirely omitted.

With this commutation operation profile, energy delivery from the external DC voltage source to the motor is therefore shut off at a suitable point in time, and the energy stored in the winding strand at the moment of shutoff is transformed via a recovery circuit into a motor torque. The energy that was stored in the relevant winding strand prior to commutation is therefore not converted into heat or buffered in a capacitor, but is for the most part used directly to generate a torque. This procedure, in which the stored magnetic energy is converted directly into mechanical energy, constitutes part of the commutation procedure, as a kind of "prelude" to the actual act of reversing the current direction in the winding strand.

It is particularly advantageous in this context if the recovery circuit, through which the current to be switched off flows, is not interrupted until the magnetic energy stored in the stator winding strand has been reduced and said stator winding is therefore approximately or entirely currentless. Currentless, low-loss commutation can thus be made possible with very simple means, and this enables higher efficiency but also the use of smaller components and higher power densities.

Another manner of achieving the stated object results from an electronically commutated single-stranded motor having a permanent-magnet rotor, a stator including a stator winding strand in which, during operation, an alternating induced voltage is generated by the permanent-magnet rotor, an H-bridge circuit having a plurality of power semiconductors forming an upper bridge half for connection to a first pole of a DC voltage source and forming a lower bridge half for connection to a second pole of the DC voltage source, wherein the stator winding strand is arranged in the diagonal portion of the H-bridge circuit and serves to carry respective current pulses alternately in a first direction and in a second direction, opposite to the first direction, and wherein switching is performed to cause magnetic energy stored in the circuit at the end of one current pulse to be converted into rotor driving energy, prior to the start of the subsequent current pulse in the reverse direction. An approach of this kind enables a compact design for such a motor, and good efficiency as well as an improved service life.

BRIEF FIGURE DESCRIPTION

Further details and advantageous refinements of the invention are evident from the exemplifying embodiments, in no way to be understood as a limitation of the invention, that are described below and depicted in the drawings.

Figure 14:
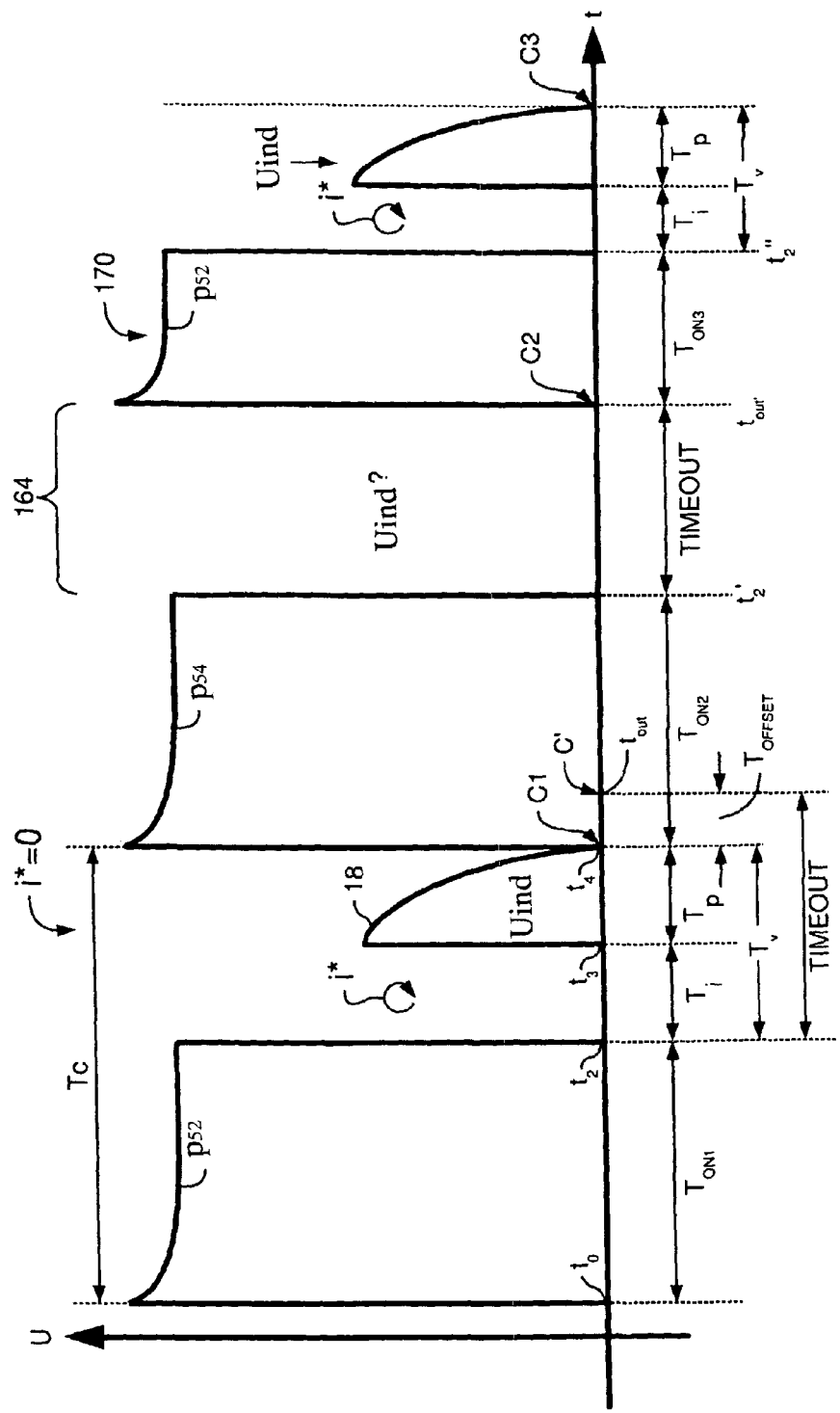

FIG. 14 schematically depicts the voltages during operation of a motor; and

Figure 15:
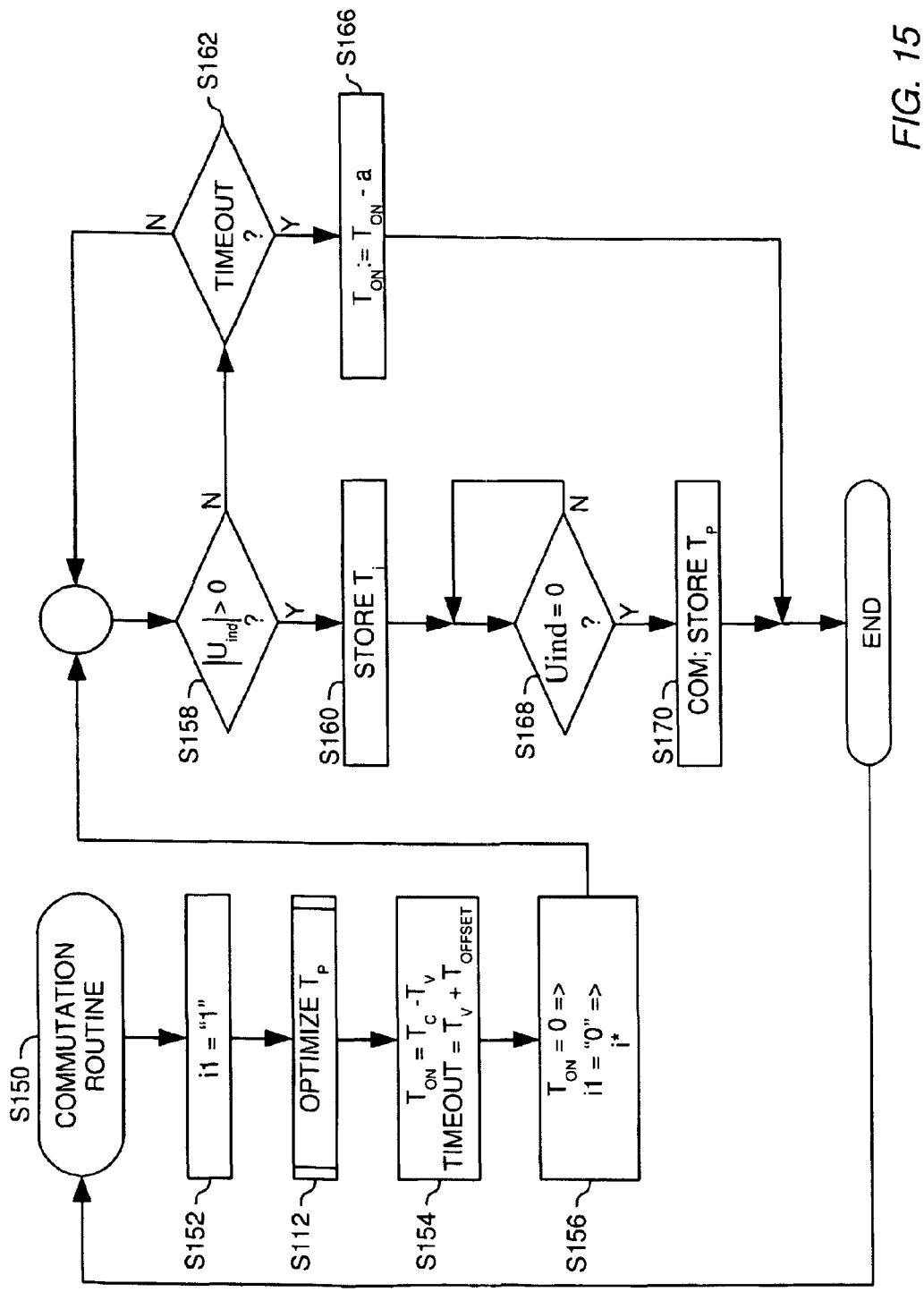

FIG. 15 is a flow chart to explain the invention.

DETAILED DESCRIPTION

Figure 1:
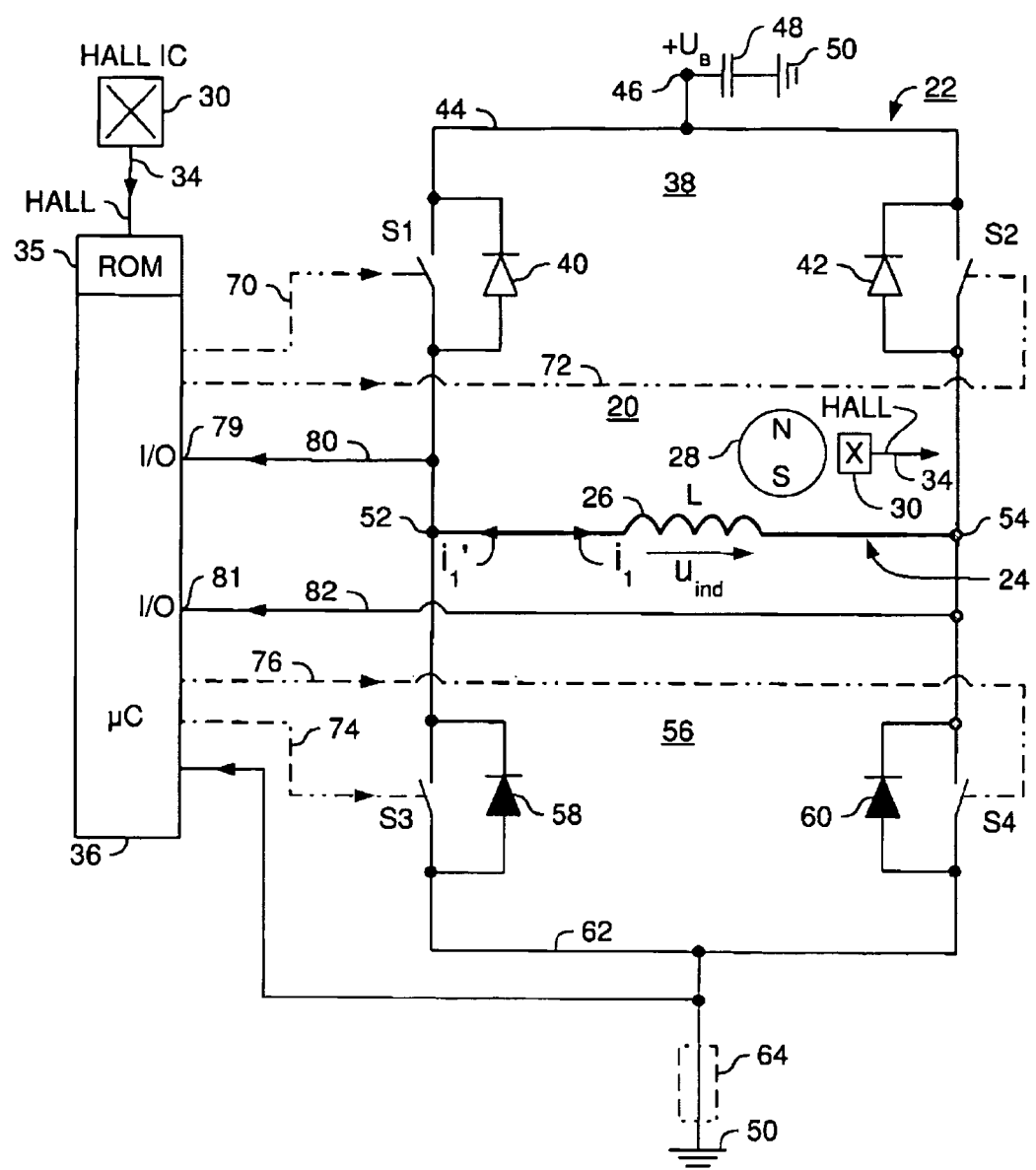
FIG. 1 is an overview circuit diagram to explain the principles of the invention.

FIG. 1 depicts, highly schematically, the basic configuration of a two-pulse, single-stranded electronically commutated motor 20 whose single winding strand 26 is operated on an H-bridge 22 whose H-shaped basic structure is highlighted with thicker lines in order to facilitate comprehension.

In a transverse branch 24 that is also referred to as the diagonal of H-bridge 22, motor 20 has, in its stator, winding strand 26 having inductance L. This strand works together with a schematically depicted permanent-magnet rotor 28 that, depending on design, can have a very wide variety of forms, e.g. internal rotor, external rotor, flat rotor, etc., and that can have varying numbers of poles, e.g. two poles (as depicted), four, six, eight poles, etc.

A Hall IC 30, which is depicted twice in FIG. 1, is controlled by the magnetic field of rotor 28. Output signal HALL of Hall IC 30 is delivered via a lead 34 to a microcontroller (µC) 36, and furnishes the latter with information about the instantaneous position of rotor 28. An exemplifying embodiment without a sensor will also be described later on, with reference to FIG. 14 and FIG. 15.

H-bridge 22 has an upper bridge half 38 in which a semiconductor switch S1 is provided to the left, and a semiconductor switch S2 to the right. A recovery diode 40 is connected in antiparallel with S1, and a recovery diode 42 in antiparallel with S2; the cathodes of said diodes are connected via a connecting lead 44 to positive pole 46 of a voltage source $U_B$. Also connected between pole 46 and ground 50 is a capacitor 48, which can be referred to as link circuit capacitor 48 and which serves to absorb a recharge current from motor 20, as will be explained in further detail later. These recharge currents can thereby be minimized with little complexity.

The anode of diode 40 is connected to a node 52, and that of diode 42 to a node 54. Winding strand 26 is arranged between nodes 52 and 54.

H-bridge 22 also has a lower bridge half 56 in which a semiconductor switch S3 is provided to the left, and a semiconductor switch S4 to the right. A recovery diode 58 is connected in antiparallel with S3, and a recovery diode 60 in antiparallel with S4. The cathode of diode 58 is connected to node 52, and that of diode 60 to node 54. The anodes of diodes 58, 60 are connected via a connecting lead 62 to ground 50. If applicable, a current measuring element 64 can be provided in the connection to ground 50, for example in order to measure the motor current so as to limit it in the event of overcurrent. Measuring element 64 is usually a low-impedance resistor.

Semiconductor switches S1 to S4 are controlled by μC 36 via control connections 70, 72, 74, 76. For this purpose, μC 36 requires information about the instantaneous rotor position, which information it obtains partly via the HALL signal. This information is not yet exact enough, however, and a datum regarding the potential at node 52 is therefore additionally delivered via a signal lead 80 to an I/O input 79 of μC 36, and a datum regarding the potential at node 54 is likewise delivered via a signal lead 82 to an I/O input 81 of μC 36. These additional data and, if applicable, logical combinations thereof, enable a substantially improved commutation operation in which it is possible to make do with a small capacitor 48 (or even none at all), i.e. without a recharge current.

FIG. 1 could therefore be regarded as a commutation control system using a combination of information from a rotor position sensor 30 and information from so-called sensorless rotor position signals, i.e. rotor position data that are derived from the induced voltage $u_{ind}$ at winding strand 26. (The induced voltage is also referred to as back-EMF.)

Figure 13:
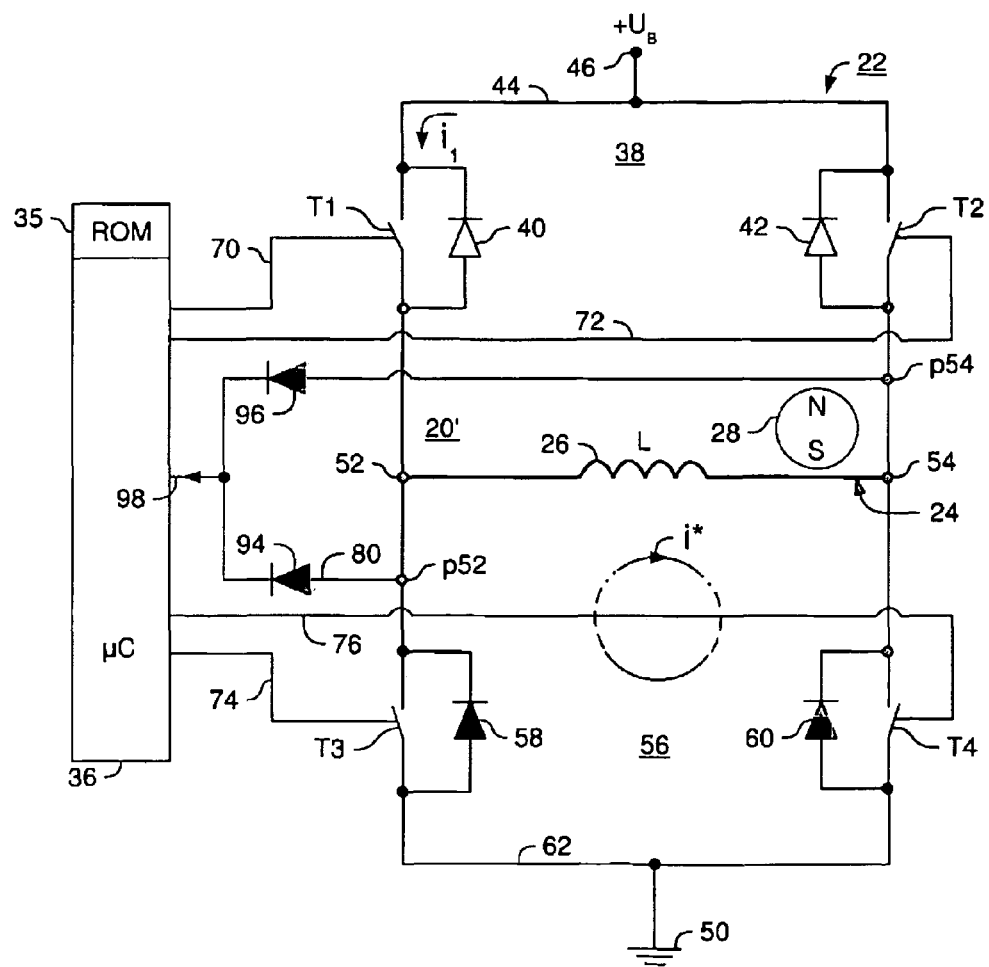
FIG. 13 depicts a variant that is implemented as a sensorless motor.

If a μC 36 has only a single I/O terminal 98, the variant depicted in FIG. 13 can be used. Here the cathodes of two diodes 94, 96 are connected to I/O terminal 98. The anode of diode 94 is connected to node 52, and the anode of diode 96 is connected to node 54. Diodes 94, 96 act as an OR circuit, so that what is delivered to terminal 98 is either potential $p_{54}$ if it is greater, or potential $p_{52}$ if the latter is greater. Diodes 94, 96 decouple nodes 52, 54 from one another.

Operation

During operation, depending on the rotational position of rotor 28, the two semiconductor switches S1 and S4 are, for example, the first to be made conductive, so that a current pulse $i_1$ flows from terminal 46 through S1, node 52, winding strand 26, node 54, and S4 to ground 50.

This current pulse $i_1$ is followed by a commutation operation, at the beginning of which energy delivery to motor 20 is interrupted by the fact that (in this example) S1 is made nonconductive. This operation will be described in detail later. At the end of the commutation operation, when no further current $i_1$ is flowing in winding strand 26, S4 is also made nonconductive and semiconductor switches S2 and S3 are made conductive, so that now a current pulse $i_1'$ flows from terminal 46 through semiconductor switch S2, node 54, strand 26, node 52, and switch S3 to ground 50.

The present invention deals with improving the commutation operation so that a capacitor 48 of smaller size is sufficient, i.e. so that a ripple current as mentioned above, which in technical terminology is also referred to as a "recharge current," is prevented or causes only small thermal losses. It is optimum when the commutation operation is improved so that capacitor 48 can be entirely omitted because the recharge current has become very small or in fact zero.

Figure 2:
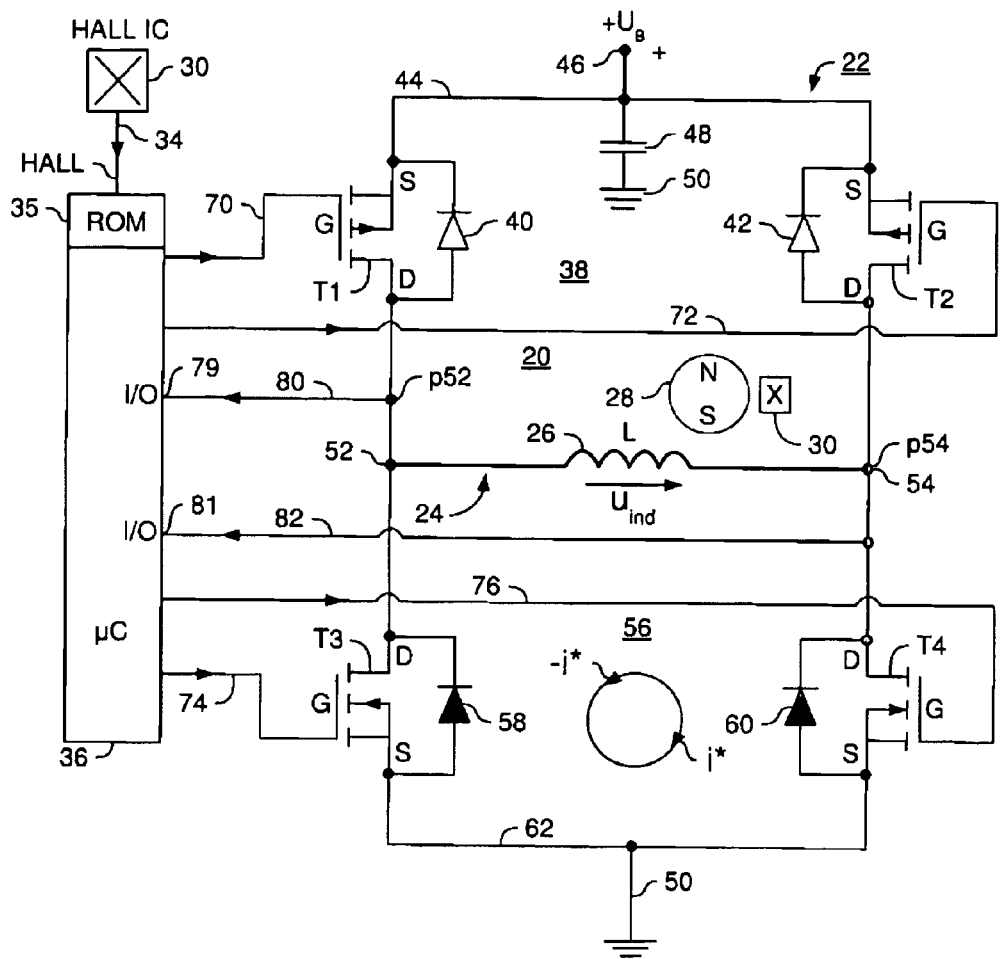
FIG. 2 is a more detailed circuit diagram analogous to FIG. 1.

FIG. 2 shows an example of the implementation of H-bridge 22 using MOSFETs (Metal Oxide Semiconductor Field Effect Transistors). Parts identical or functionally identical to those in FIG. 1 have the same reference characters as therein, and are usually not described again.

What is provided here instead of semiconductor switch S1 of FIG. 1 is a p-channel MOSFET T1, whose source S is connected to terminal 46 and whose gate G is controlled by μC 36 via lead 70. Recovery diode 40 is connected in antiparallel with MOSFET T1. In many cases, a recovery diode of this kind is already present in the MOSFET as a so-called "parasitic" recovery diode. If not, it can be implemented as a separate component.

A p-channel MOSFET T2, with which recovery diode 42 is connected in antiparallel, is similarly present instead of semiconductor S2 of FIG. 1. Transistor T2 is controlled by μC 36 via lead 72.

Instead of semiconductor switch S3 of FIG. 1, in FIG. 2 an n-channel MOSFET T3 is provided, with which recovery diode 58 is connected in antiparallel. Its source S is connected to ground 50, and its drain D, like that of transistor T1, is connected to node 52. It is controlled by the μC via a lead 74.

Similarly, instead of semiconductor switch S4 of FIG. 1, an n-channel MOSFET T4 is provided, with which recovery diode 60 is connected in antiparallel. Its drain D, like drain D of semiconductor switch T2, is connected to node 54. MOSFET T4 is controlled by μC 36 via control lead 76.

Potential $p_{52}$ at node 52 is delivered through lead 80 to measurement input 79 of μC 36, and the potential $p_{54}$ at node 54 is analogously delivered via lead 82 to measurement input 81.

In order to explain the manner of operation of FIG. 2, reference is made to the Figures that follow it.

Figure 3:
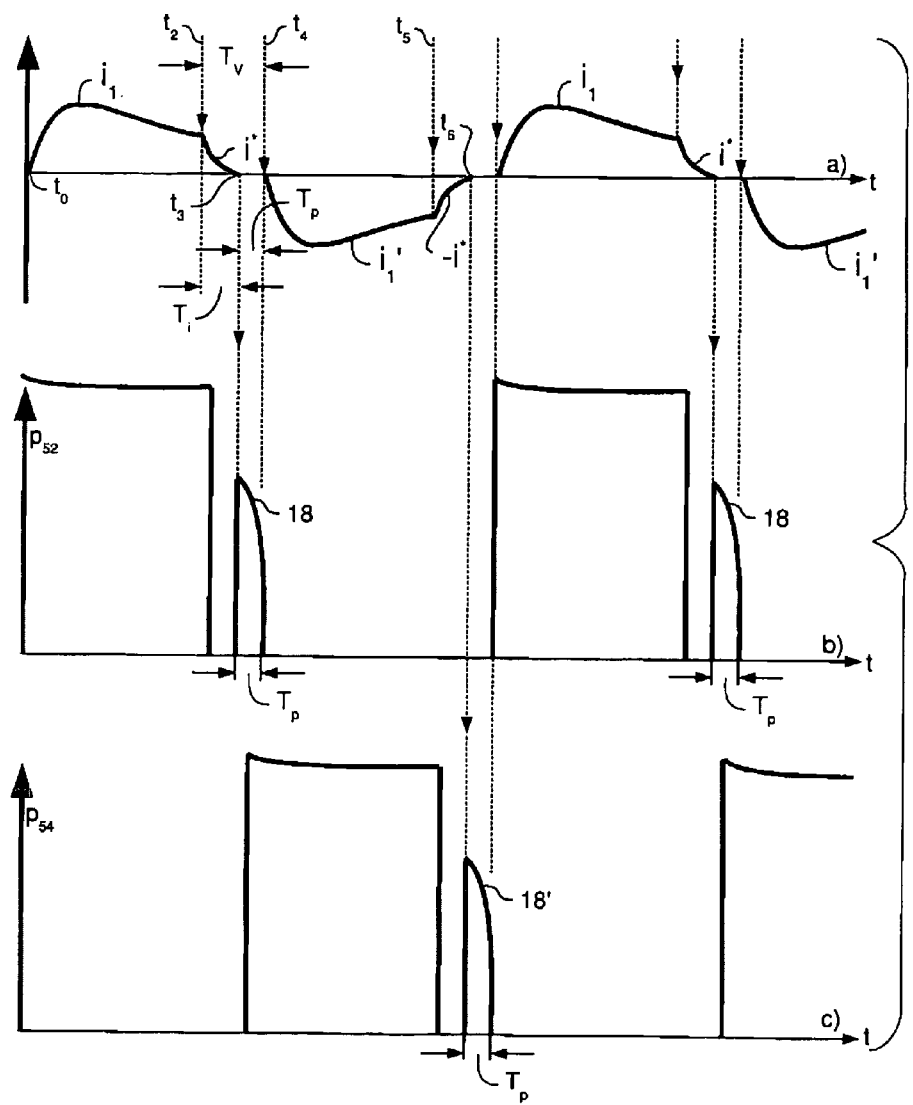
FIG. 3 is a schematic depiction to explain the commutation operations.

FIG. 3 shows in line a) the current in strand 26 of FIG. 2; in line b) the potential $p_{52}$ occurring in that context at node 52, which potential corresponds to the potential at the drains of transistors T1 and T3; and line c) shows the potential $p_{54}$ occurring in that context at node 54, i.e. at the drains of the two transistors T2, T4.

FIG. 3a shows, at the extreme left, the current $i_1$ that flows when the two transistors T1 and T4 are conductive. Current $i_1$ begins at a time $t_0$. At a time $t_2$, transistor T1 is blocked by μC 36 so that energy delivery from DC power network $U_B$ to motor 20 is interrupted, and a loop current i* flows clockwise in lower bridge half 56 of FIG. 2 (cf. FIG. 7); after a time span $T_i$, this current becomes zero at a time $t_3$ because the energy stored magnetically in the motor has been completely converted into rotational energy of rotor 28.

During time period $T_i$, which usually lasts only a few microseconds, potentials $p_{52}$ and $p_{54}$ have a value of zero as a consequence of loop current i*, as depicted in FIG. 3b) and FIG. 3c), i.e. the voltage $u_{ind}$ (FIGS. 1 and 2) cannot be measured during $T_i$.

Once loop current i* has become zero at time $t_3$, however, it is possible to measure at node 52 a potential $p_{52}$ that corresponds to the induced voltage and that consequently indicates that winding strand 26 has become currentless. A pulse 18 having a duration $T_p$ occurs in this context at node 52 (FIG. 3b). As of time $t_3$, transistor T4 can be wattlessly blocked, and transistor T3 can likewise be wattlessly switched on.

This currentless state lasts until time $t_4$ in FIG. 3a, i.e.

$$T_p = t_4 - t_3 \tag{2}$$

The time span $T_p$ represents a buffer time that should not fall below a minimum duration $T_{pmin}$, but on the other hand also must not become too long, since otherwise the output of motor 20 becomes too low; this is because during time span $T_p$, no energy is being delivered from outside to motor 20.

As of time $t_4$, both transistors T2 and T3 in FIG. 2 are switched on, so that in FIG. 2 a current $i_1'$ flows from node 54 to node 52. At a time $t_5$ transistor T2 then becomes blocked while transistor T3 remains conductive, so that a loop current −i* (FIGS. 2 and 3) flows; at a time $t_6$ this current becomes zero, so that potential $p_{54}$ at node 54, which potential had a value of zero for the duration of loop current −i*, can be measured as of $t_6$.

Potential $p_{54}$ corresponds to the voltage induced by the rotating rotor 28 in winding strand 26, and is indicated here schematically as pulse 18 (or as pulse 18'). The length and shape of pulses 18, 18' depend on the length of the currentless time period $T_p$ between $t_3$ and $t_4$. In practice, the period $T_p$ is very short, so that what is obtained at node 52 is only a short pulse 18 which represents a confirmation that commutation can now occur. This pulse is also a sensorless signal for the rotational position of rotor 26.

Interval $T_v$ between time $t_2$ at which energy delivery from DC voltage source $U_B$ to strand 26 was interrupted, and time $t_4$ at which that energy delivery is switched back on, should of course be as short as possible, since motor output is then at its highest. This time period $T_v$ is optimized by way of a program routine in microcontroller 38.

Figure 4:
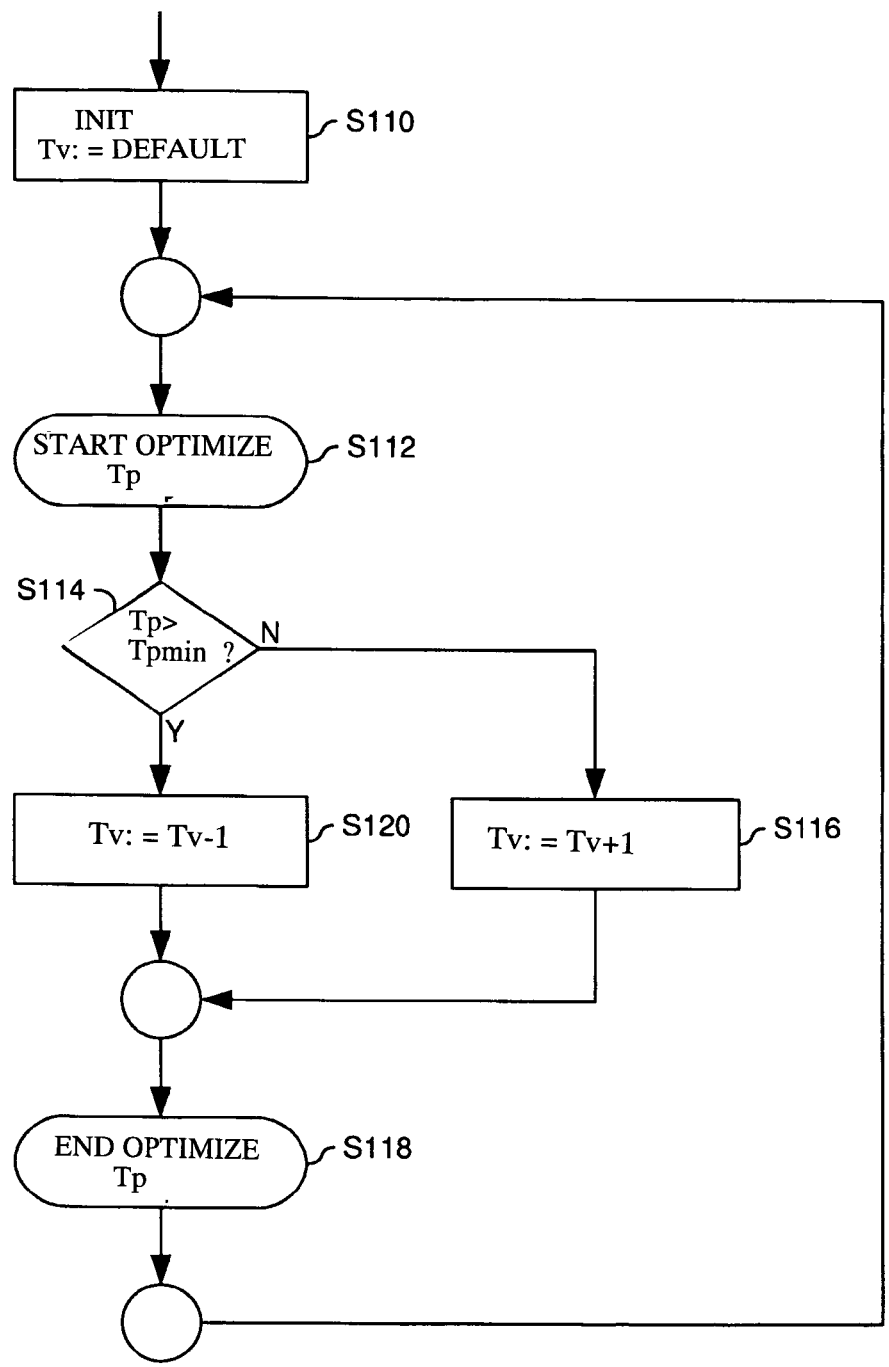
FIG. 4 depicts a routine for optimizing a time span $T_v$ that is depicted in FIG. 3.

FIG. 4 shows a routine for optimizing time period $T_p$. $T_p$ should be sufficiently long that when current looping ends, i.e. when loop current i* or −i* has reached a value of zero, a rising edge 18 or 18' (FIG. 3) can be measured; in other words, $T_p$ should be limited at the lower end by a minimum value $T_{pmin}$ so that asymmetries in, for example, the electronics or the motor geometry do not jeopardize the detection of edges 18, 18' (FIG. 3).

As is clearly apparent from FIG. 3, the time span $T_v=t_4-t_2$ increases as $T_p$ becomes longer.

Upon initialization of motor 20, $T_v$ is therefore set in S110 to a default value that is stored in ROM 35 of µC 36, e.g. in a value table.

The optimization routine begins in S112.

S114 checks whether $T_p$ is still above a minimum buffer time $T_{pmin}$. If so, the value $T_v$ can be decremented in S120, with the result that $T_p$ is also reduced. Execution then exits from the optimization routine (S118) on this program path.

If the response to the query in S114 is No, i.e. if $T_p$ corresponds to or is less than $T_{pmin}$, signals 18 and 18' are then arriving too late. This means that a critical region is being approached in which the winding current can no longer be completely reduced prior to the zero transition of the induced voltage. The time period $T_v$ is therefore incremented in S116 so that the minimum buffer time $T_{pmin}$ is once again exceeded. Execution then once again exits from the optimization routine (S118) on this program path.

As FIG. 4 shows, the routine according to FIG. 4 is continuously cycled through so that the values for $T_p$ and $T_v$ are continuously kept in an optimum range in which motor 20 generates its optimum output without generating a recharge current into capacitor 48. In other words, the time $T_i$ becomes long enough that loop current i* or −i* can drop to zero before commutation, and currentless commutation is possible.

Figure 5:
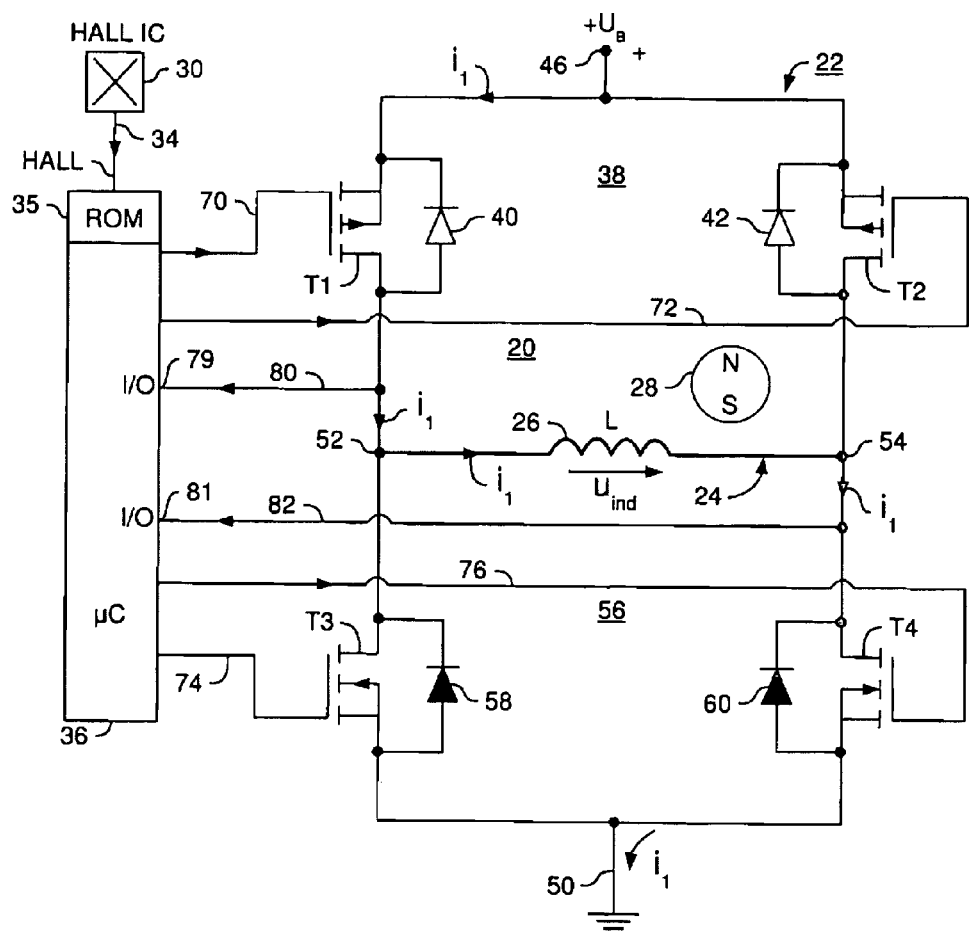
FIG. 5 depicts a current $i_1$ that flows in winding strand 26 within a specific rotation-angle region.
Figure 6:
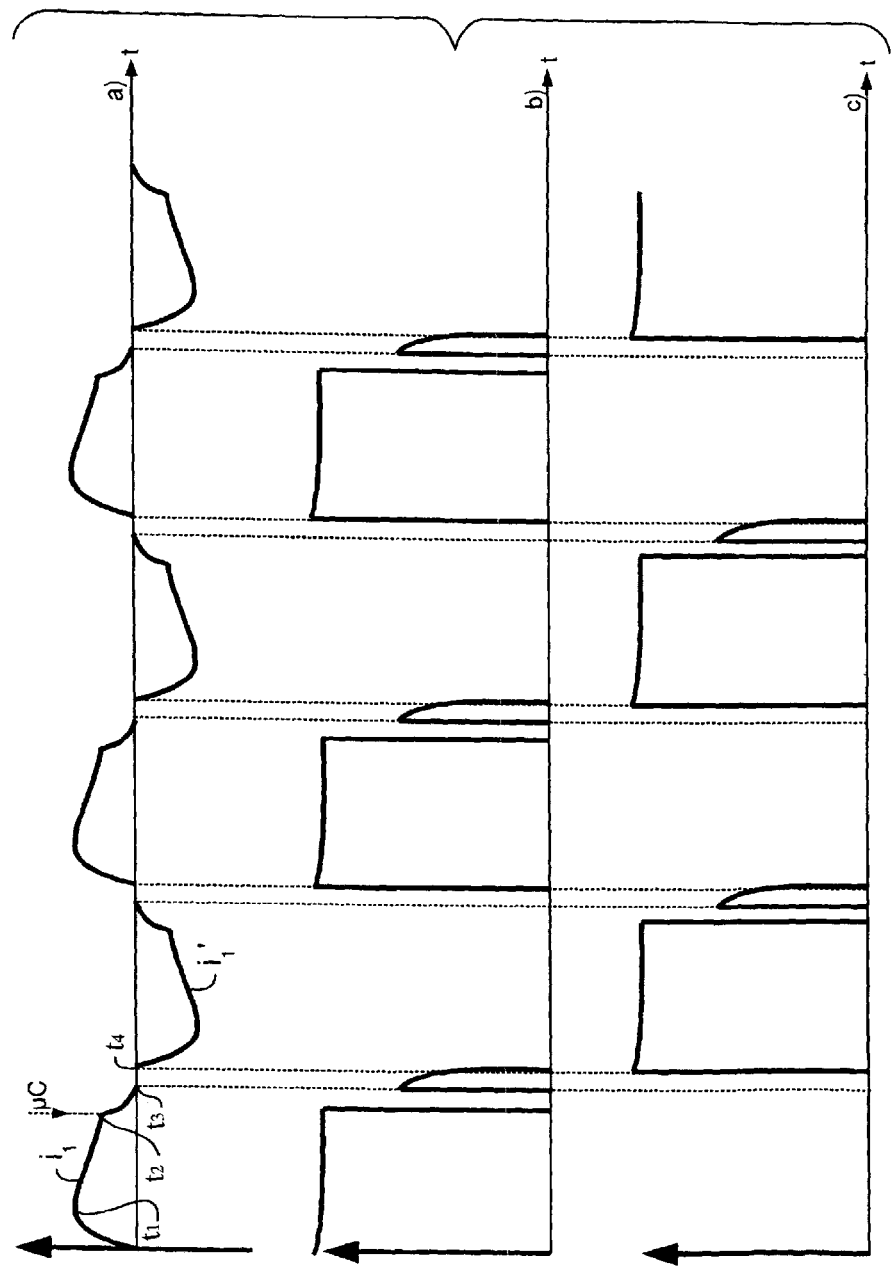
FIG. 6 depicts a time profile of current $i_1$.

FIG. 5 shows the circumstances in motor 20 at time $t_1$ of FIG. 6. Current $i_1$ is flowing from terminal 46 through transistor T1, node 52, winding strand 26, node 54, and transistor T4 to ground 50. This current $i_1$ has a shape that depends on the shape of induced voltage $u_{ind}$ at winding strand 26. Transistors T2 and T3 are not conductive at time $t_1$.

Figure 7:
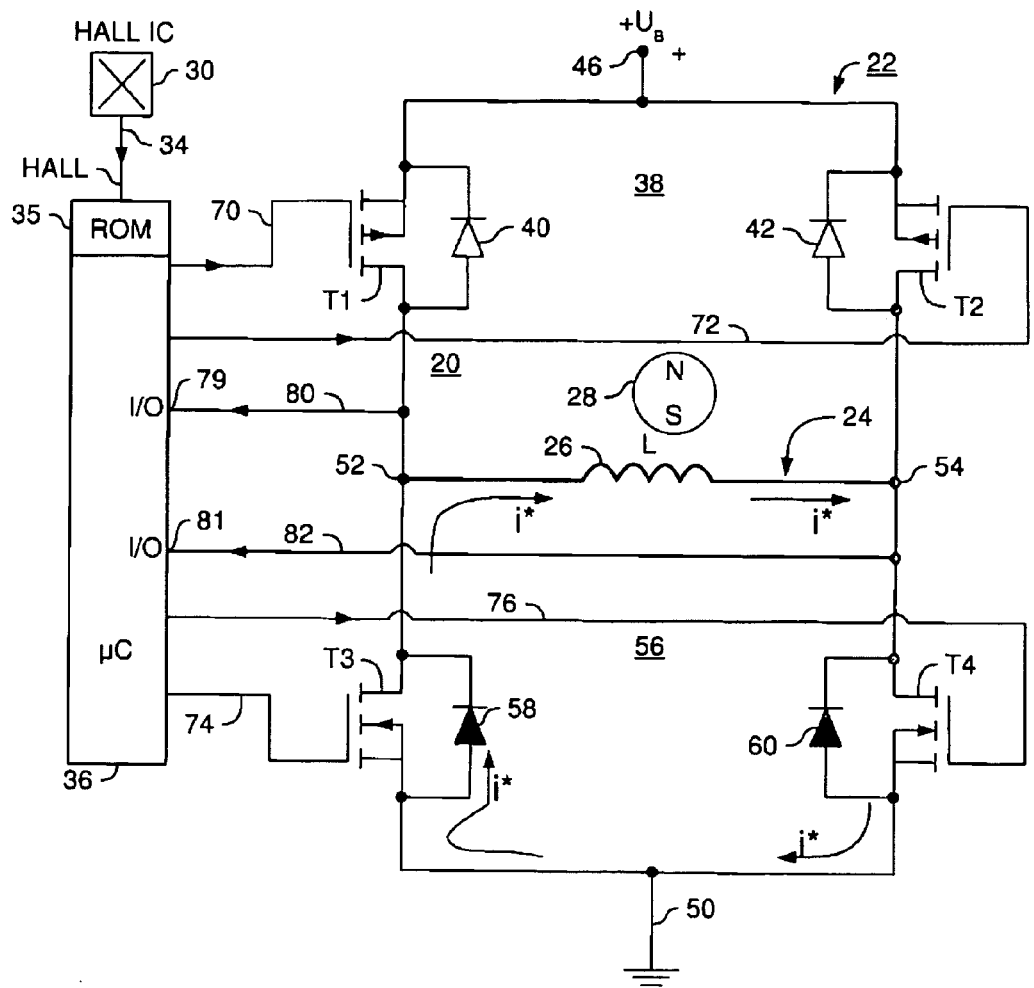
FIG. 7 depicts a loop current i* that flows during the commutation operation.
Figure 8:
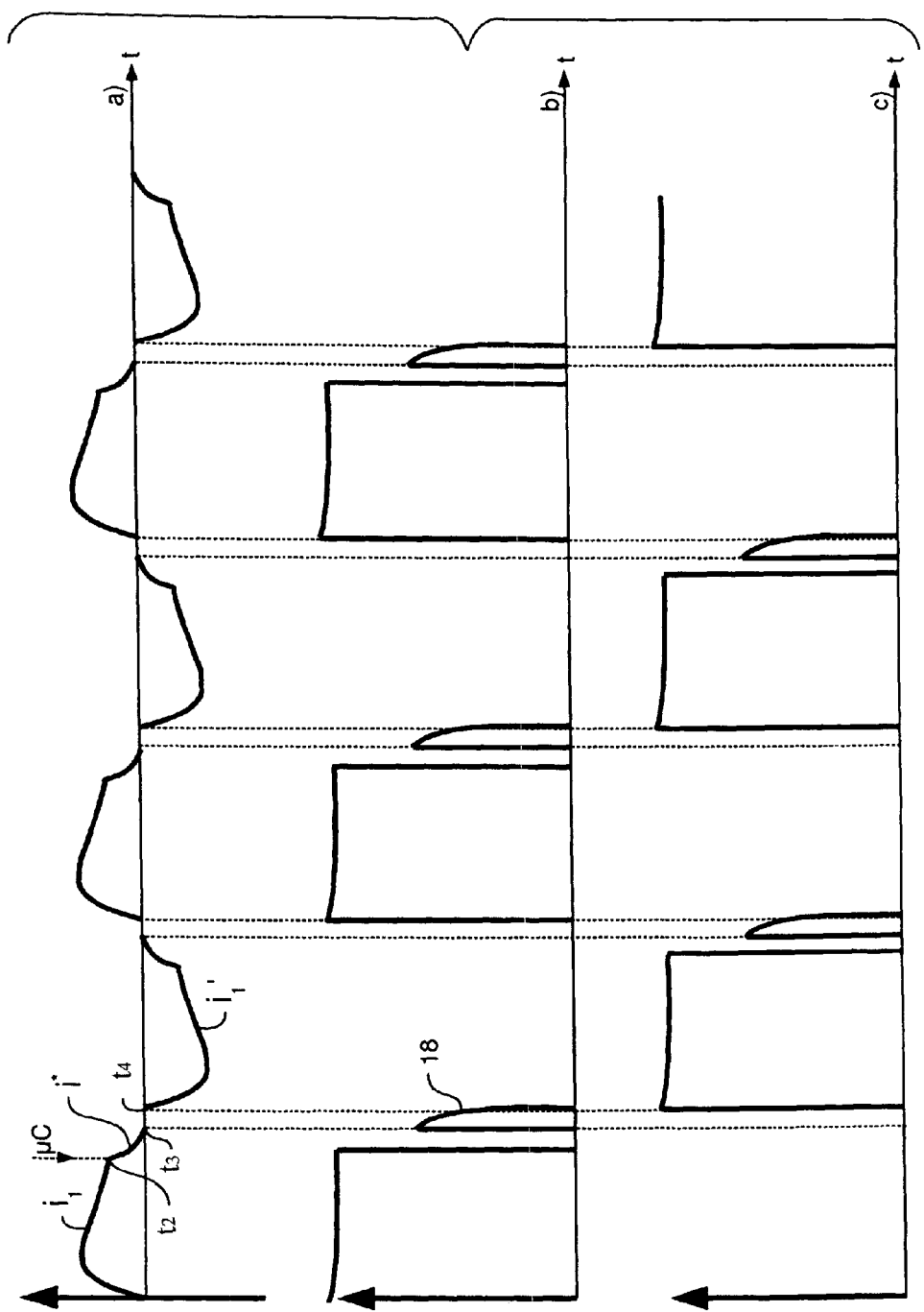
FIG. 8 is a corresponding depiction analogous to FIG. 6.

FIG. 7 shows the status at time $t_2$ (FIG. 8), at which transistor T1 receives a shutoff instruction from µC 36 via lead 70. Because transistor T2 is also blocked, no further energy can travel from DC voltage network $U_B$ to winding strand 26. The magnetic energy stored in winding strand 26, however, causes a loop current i* that flows through node 54, transistor T4 (still conductive), transverse connection 62, recovery diode 58 of blocked transistor T3, node 52, and winding strand 26 back to node 54. As a result of this loop current i*, the energy stored in the magnetic circuit of motor 20 is converted into mechanical energy that drives rotor 28.

Current i* loops around in short-circuit fashion in the manner described, and thereby continues to drive rotor 28. As FIG. 8b shows, this current i* keeps potential $p_{52}$ at node 52 low during the time period between $t_2$ and $t_3$, since said node is connected to ground 50 via the conductive diode 58. This low potential is delivered via lead 80 to input 79 of µC 36 so that the latter receives the information that a (decaying) loop current i* is still flowing. In the absence of energy delivery, this loop current rapidly drops to zero.

The state i*=0 is reached at $t_3$, and from that point in time the voltage induced in winding strand 26 can therefore be measured at node 52; it is delivered via lead 72 to input 79 of µC 36 and indicates to the latter that winding strand 26 has now become currentless, and that wattless commutation is possible.

Figure 9:
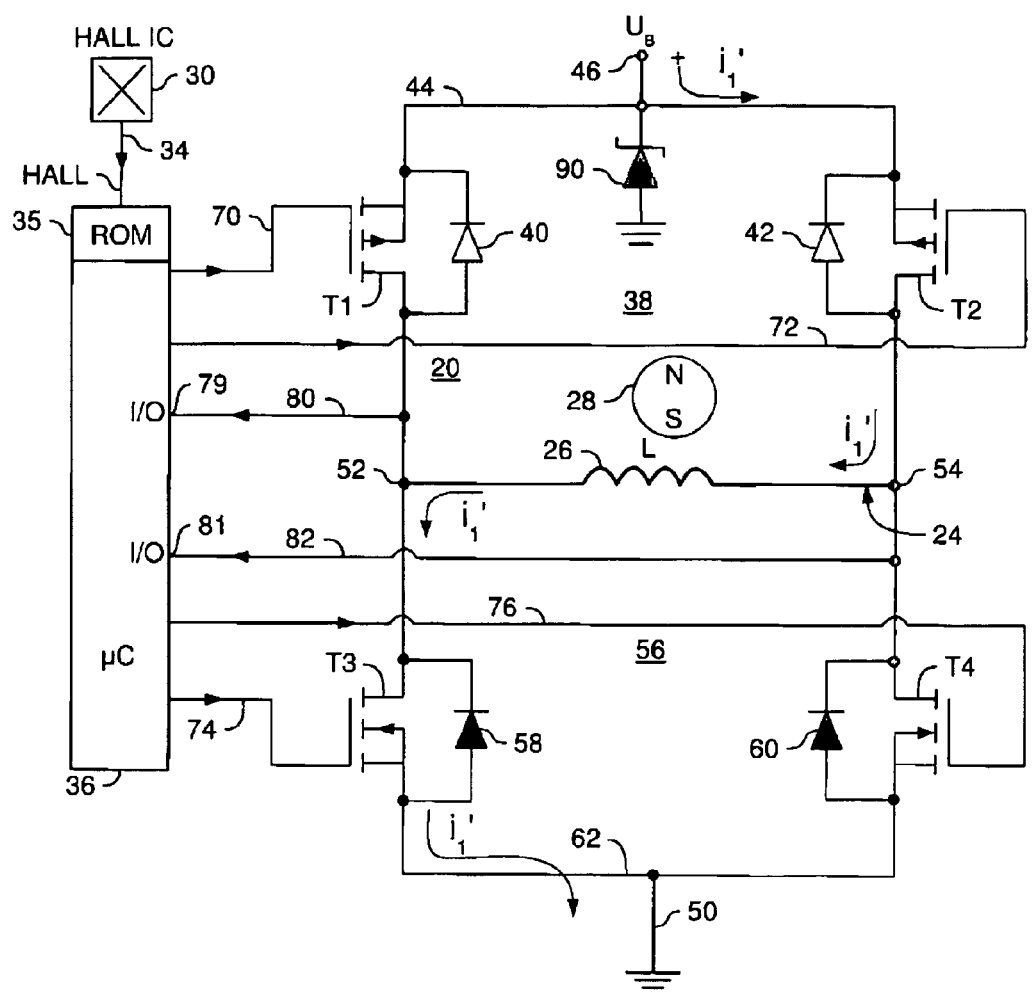
FIG. 9 depicts a current $i_1'$ that flows after a commutation operation.
Figure 10:
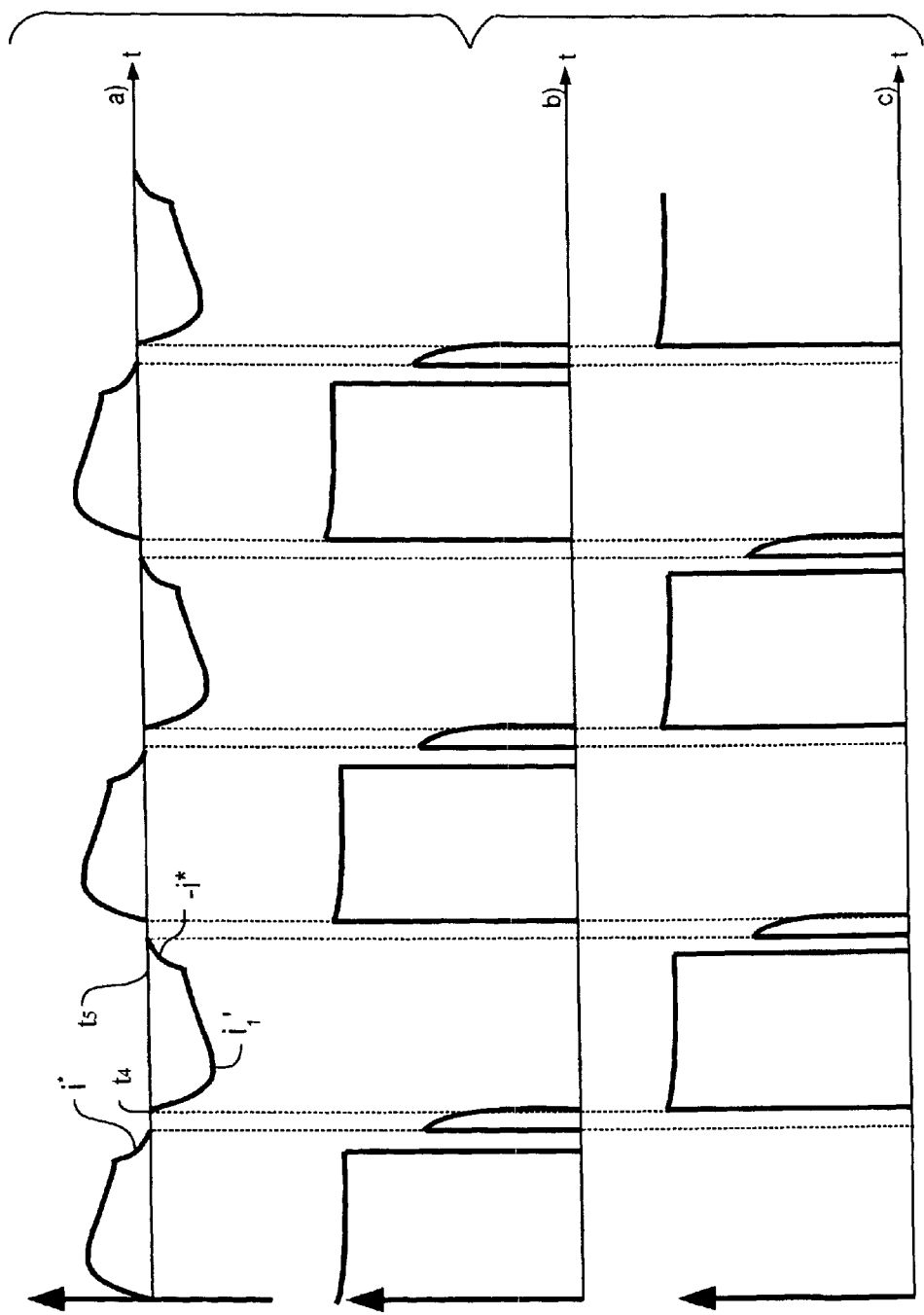
FIG. 10 is a corresponding depiction analogous to FIGS. 6 and 8.

Commutation thus occurs again at time $t_4$ (which of course should be as close as possible to time $t_3$), yielding the situation according to FIG. 9 and FIG. 10.

At time $t_4$, transistor T1 is already blocked and transistor T4 is likewise blocked by a corresponding signal from µC 36. Transistors T2 and T3 are made conductive by µC 36 so that a current $i_1'$ now flows from terminal 46 through transistor T2, winding strand 26, and transistor T3 to ground 50. The direction of this current $i_i*$ in winding strand 26 is thus opposite to that of current $i_1$ in FIG. 3, and is therefore depicted in FIG. 10a) as a negative current.

Figure 11:
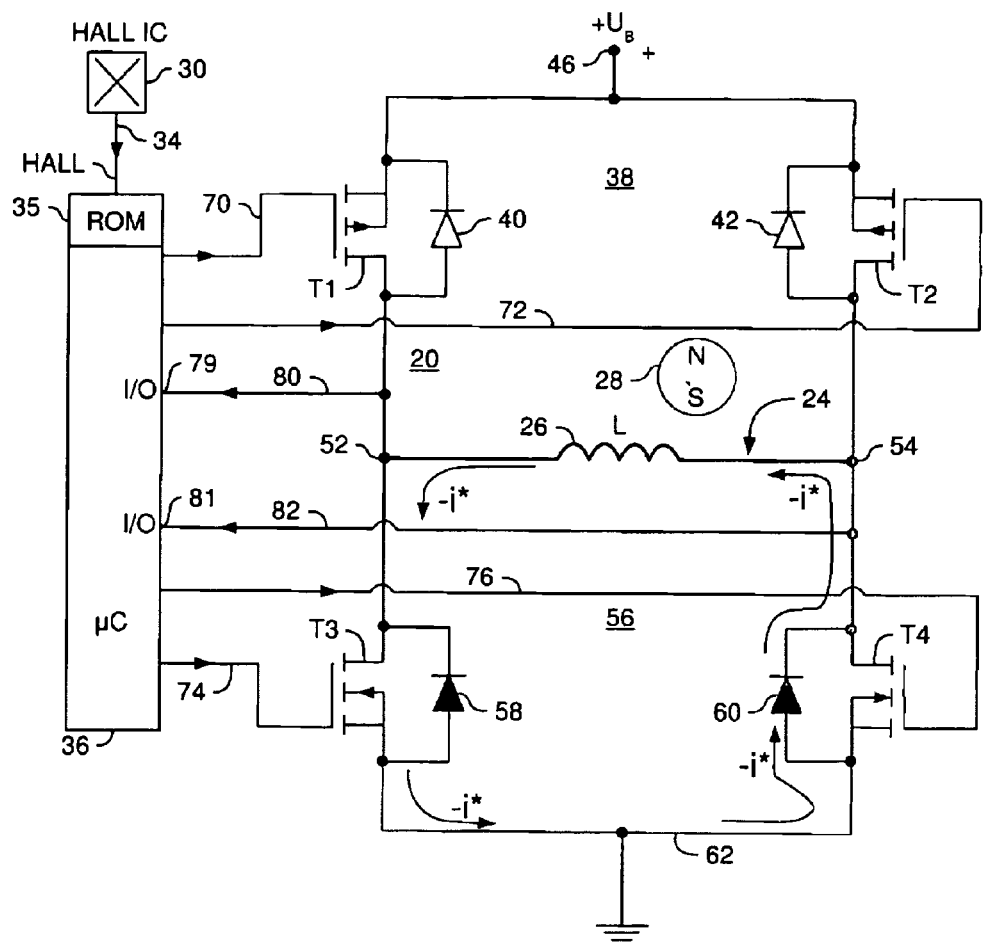
FIG. 11 depicts a loop current −i* that flows subsequently to the depiction according to FIGS. 9 and 10.
Figure 12:
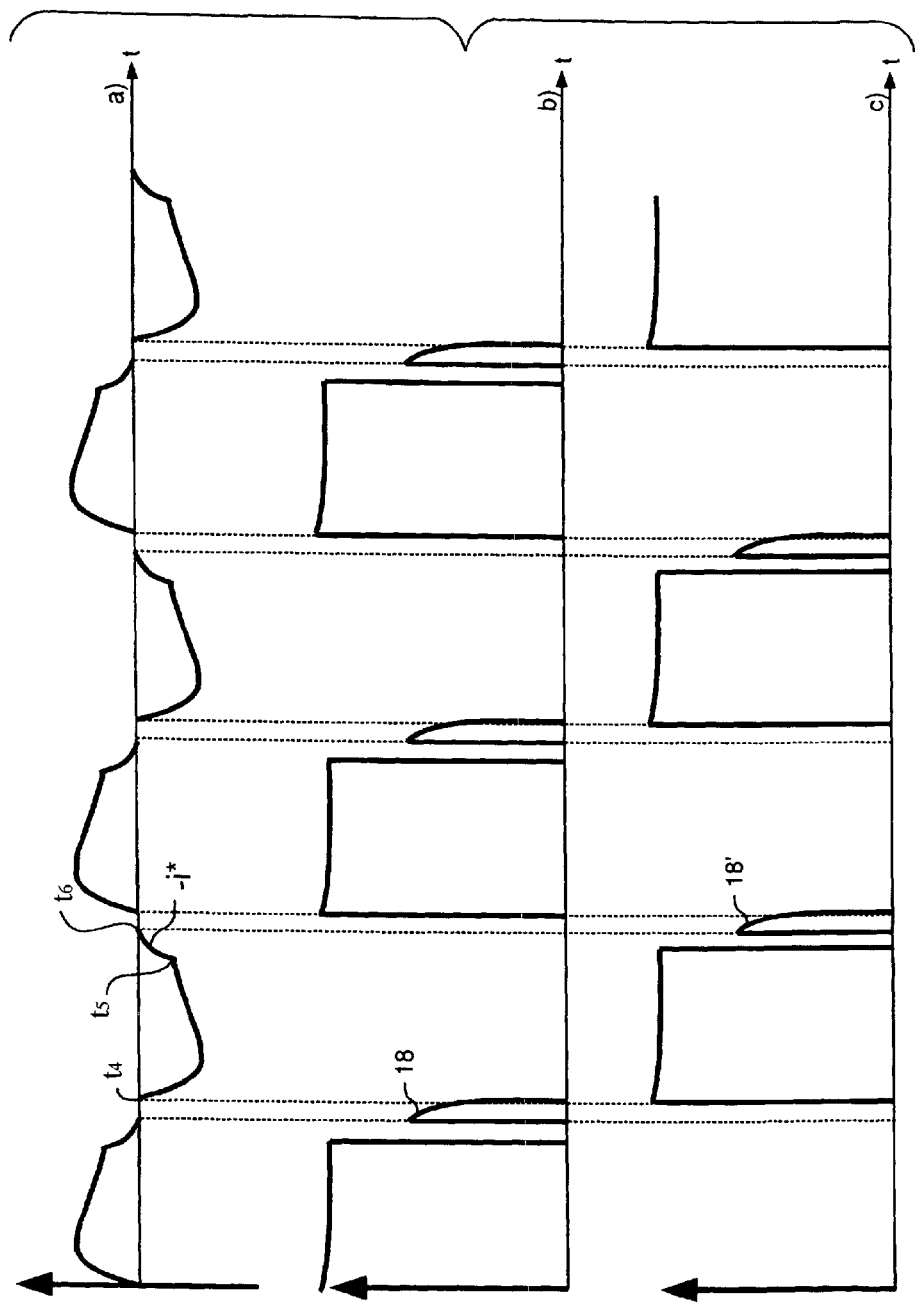
FIG. 12 is a corresponding depiction analogous to FIGS. 6, 8, and 10.

At a time $t_5$ (FIG. 10a)), transistor T2 is made nonconductive so that energy delivery from DC voltage network $U_B$ is interrupted. A loop current −i* therefore now flows through winding strand 26 as depicted in FIG. 11 and FIG. 12. This current flows from node 52 through transistor T3 (still conductive), transverse connection 62, recovery diode 60, node 54, winding strand 26, and back to node 52. The energy that was stored in the magnetic circuit of motor 20 at time $t_2$ is thereby converted into mechanical energy of motor 20, so that no recharge current flows in the connection to capacitor 48.

Loop current −i* reaches a value of zero at time $t_6$, and a signal 18' differing from a zero value is consequently obtained at node 54; this signal 18' is delivered via lead 80 to measurement input 69 of µC 36, and indicates to it that commutation can occur.

The exact moment of commutation is calculated in each case by µC 36 on the basis of information from Hall IC 30, or is controlled directly by the HALL signal, and causes transistor T4 to be blocked and transistors T2, T3 to be made conductive, with the result that the operations that were described in detail above with reference to FIGS. 5, 6, 7, and 8 are repeated.

Upon startup or in the event of a load change in motor 20, for example because of a wind gust in the case of a fan, it may happen that the presently conducting transistor T1 or T2 of upper bridge half 38 is made nonconductive too late, with the result that a loop current i* is still flowing in winding strand 26 at the moment of commutation (e.g. $t_4$ in FIG. 3). A currentless commutation is not possible in such a case, and protective measures must be taken.

One possibility is to use a link circuit capacitor 48 that, in such a case, absorbs the remaining energy from winding strand 26 and thereby limits the voltage at terminal 46. This is depicted in FIGS. 1 and 2. The second possibility is to limit voltage $U_B$ using a Z diode 90. This is depicted in FIG. 9. The two possibilities can also be combined.

When a motor in a fan starts up, at first no induced voltage $u_{ind}$ is present at winding strand 26 because rotor 28 is at a standstill. The consequence of this is that the current in winding strand 26 is limited only by the resistance of that winding strand. For this reason, it may be useful to limit the current in winding strand 26. This is the purpose served by measuring resistor 64 that is depicted in FIG. 1. When the current in this resistor 64 exceeds a predetermined value, the current in winding strand 26 is interrupted. The upper or lower semiconductor switches in H-bridge 22 can be used for this purpose. In this case as well, the magnetic energy stored in winding strand 26 can be converted into mechanical energy in exactly the same way by generating a loop current i*.

Motors are often equipped with circuits that detect when motor 20 is stalled. These circuits function in such a way that with the motor in the switched-on state, an alarm is generated when the rotation speed falls below a minimum value. If the motor is being operated slightly above its minimum rotation speed, however, it is impossible to distinguish whether this is the consequence of a low operating voltage or of a very high load. In this case a stall protection system therefore cannot ascertain a motor overload.

As the load on a motor rises, the supply current to the motor thus also rises. Time $t_2$ must therefore be "advanced," i.e. shifted to the left in FIG. 3, in order to enable loop current i* to decay by the time the commutation operation ends. μC 36 can sense the time $T_i$ during which a loop current i* is flowing between times $t_2$ and $t_3$, and this time becomes longer as the load on motor 20 rises. This time $T_i = t_3 - t_2$ can therefore be sensed by microcontroller 36 and used as an indication of the applied load. Overload protection can be implemented in this fashion, without additional outlay, by e.g. switching off motor 20 when a stipulated duration $T_i$ is exceeded.

Sensorless Commutation

FIG. 13 shows a sensorless motor 20'. When a voltage $u_{ind}$ induced by rotor 28 is present in stator winding 26 and can be sensed electrically, motor 20' can be commutated in "sensorless" fashion.

"sensorless" means that Hall sensor 30 can be omitted, which has a positive effect on cost and on the usability of motor 20' in "austere" environmental conditions, for example on a hot machine or in the vicinity of a blast furnace. This is because Hall sensors, at high temperature and with increasing distance from the sensor magnet, exhibit increasingly poor characteristics which can be circumvented in this manner. The efficiency of the motor is also improved as a result.

In sensorless commutation, the point in time at which the current flowing through upper bridge half 38 is shut off is regulated by μC 36. This point in time must be calculated in advance, and regulated if applicable, in such a way that the magnetic energy stored in winding strand 26 has been converted into mechanical energy before commutation occurs. The exact moment of commutation can be ascertained by way of the induced voltage $u_{ind}$ that rotor 28 induces in winding 26 when the latter is currentless. When rotor 28 is rotating, the polarity of the induced voltage continuously changes. This change, i.e. the zero transition of the induced voltage, can be sensed by μC 36 and used as a signal for commutation.

It is important that winding strand 26 be currentless at commutation, since otherwise the induced voltage cannot be sensed, and since in such a case no HALL signal is present, so that microcontroller 36 becomes disoriented, so to speak.

This must be prevented by way of a safety function. This checks whether at the present rotation speed (plus a safety reserve), the induced voltage can be sensed. If not, commutation occurs even though the induced voltage cannot be sensed; and at the next commutation operation, winding strand 26 receives only a short current pulse, so that the induced voltage can now be sensed and evaluated again with greater reliability, and μC 36 can once again reliably ascertain the position of rotor 26. This is explained below using an example.

FIG. 14 is a depiction similar to FIG. 3b) but for sensorless motor 20' according to FIG. 13. The same reference characters as in FIG. 3 are therefore used.

When a current $i_1$ flows through MOSFET T1 in FIG. 13, an elevated potential $p_{52}$ at drain D of MOSFET T1 is obtained in FIG. 14 between times $t_0$ and $t_2$. The relevant equation is:

$$T_{ON} = t_2 - t_0 \quad (3).$$

In the case of a sensorless motor, data are needed regarding time $t_0$ for switching on MOSFET $T_1$, and information is also needed for duration $T_{ON}$ that indicates the time span during which a current $i_1$ is to flow out of DC voltage network $U_B$ via MOSFET T1 to and through winding strand 26.

MOSFET T1 is blocked at time $t_2$ so that no further energy can be delivered from DC voltage network $U_B$ to motor 20, and instead a loop current i* flows as depicted in FIG. 7 and FIG. 14. This loop current i* decreases over a time span $T_i$, and reaches a value of zero at time $t_3$. The time span $T_i$ during which loop current i* is flowing can be measured because its starting point $t_2$ is known, and because at its end $t_3$ an induced voltage 18 ($u_{ind}$) occurs at drain D of MOSFET T1, i.e. at node 52. This voltage is caused by the voltage induced by rotating rotor 28 in winding strand 26, which latter voltage occurs only when loop current i* has decayed to zero.

Voltage pulse 18 is induced by the rotating rotor magnet 28 (FIG. 13) in winding strand 26; it consequently decreases after time $t_3$, and passes through zero at time $t_4$ (FIG. 14). In FIG. 13 it is delivered through signal lead 72 and diode 96 to μC 36, and the existence of pulse 18 indicates to μC 36 that winding strand 26 has now become currentless. No current flows in winding strand 26 during the period $$T_p = t_4 - t_3 \quad (4),$$

and this period can likewise be measured, since its beginning and its end can be measured. As in FIG. 3, the applicable equation is $$T_V = T_i + T_p \quad (5).$$

At time $t_4$, i.e. at the point where the polarity of induced voltage $u_{ind}$ changes, commutation can occur in currentless fashion, and commutation therefore preferably occurs at this point (labeled C1).

In the context of a sensorless commutation, a calculation is also made (as a safety feature) of a time span after which commutation will occur no matter what, and this time span is referred to here as "TIMEOUT." This TIMEOUT time span is measured as of time $t_2$ in FIG. 14, and its end $t_{out}$ should always be later in time than time $t_4$ so that when the motor is running normally, this function does not take effect at all, since commutation has already occurred before it elapses. A prerequisite for this is that the statement $$\text{TIMEOUT} > T_V \quad (6)$$

be valid.

It may be the case, for various reasons, that the values for $T_{ON}$ and/or for $(T_t+T_p)$ are calculated predictively in such a way that the motor is not yet running optimally. This condition must then be corrected, and this purpose is served by the optimization routine depicted in FIG. 15. This routine optimizes the length of time span TC (FIG. 14) between two successive commutation times, e.g. between times $t_0$ and $t_4$ in FIG. 14.

This routine also requires that motor 20' (FIG. 13) be rotating.

The routine of FIG. 15 begins at step S150. In step S152, current $i_1$ (FIG. 13) is switched on at a time $t_0$, i.e. $i_1$="1". As FIG. 13 shows, current $i_1$ flows from terminal 46 through MOSFET T1, stator winding 26 (from left to right), and through MOSFET T4 to ground 50, and drives rotor 28.

While current $i_1$ is flowing through winding 26 (and similarly when current $i_1'$ (cf. FIGS. 9 and 10) is subsequently flowing in the opposite direction from right to left through winding 26), subroutine S112 of FIG. 4 is executed in S112, i.e. duration $T_p$ is optimized to a value $T_{pmin}$ at which the output of motor 20 is close to optimum. These are steps S112, 114, 116, 118, and 120 of FIG. 4, which were described in detail with reference to FIG. 4. When motor 20 is running, the value $T_V$ for this subroutine is transferred from the previous commutation.

While current $i_1$ (or $i_1'$) is flowing, calculations are continuously taking place. Step S154 uses a value $T_C$ that corresponds to the time for one rotation of rotor 28 through 180° el. This value indicates (indirectly) the rotation speed of motor 20 and can be calculated, for example, from the interval between two succeeding commutation times $C_n$ and $C_{(n-1)}$, i.e.

$$T_C = C_n - C_{(n-1)} \qquad (7).$$

The time span $T_{ON}$ within which, at maximum, a current can flow in the region between two commutation times is, according to FIG. 14, $$T_{ON} = T_C - T_V \qquad (8).$$

This time span $T_{ON}$ is calculated in S154, and indicates when the current pulse that is presently flowing must be switched off. Because $T_C$ is determined by the instantaneous rotation speed, and because $T_V$ was just optimized in routine S112, $T_{ON}$ is a very up-to-date value and results in smooth motor operation.

In S154, the time span TIMEOUT is similarly calculated from the value $T_V$ (just updated in S112 (FIG. 4)) and from a variable $T_{Offset}$ that represents an empirical value and is depicted in FIG. 14.

In S156 the time span $T_{ON}$ has elapsed, i.e. $T_{ON}$=0; this corresponds to time $t_2$ in FIG. 14. Current $i_1$ is therefore switched off (i.e. $i_1$=0), and the loop current i* already described then flows during the period $T_i$. This is because when a motor current $i_1$ (or $i_1'$) is flowing, magnetic energy is stored in stator winding strand 26 (see equation (1)) and current $i_1$ initially continues to flow, specifically as loop current i* clockwise from node 52 through strand 26 via node 54 and MOSFET T4, then via connection 62 and diode 58 back to node 52. The loop current i* that flows in this case continues to drive rotor 28, and decreases rapidly as a result, i.e. the stored magnetic energy is rapidly converted into kinetic energy of rotor 28.

S158 constantly checks whether loop current i* is still flowing. This can be measured indirectly by the fact that in FIG. 13, induced voltage $u_{ind}$ is measurable at input 98 of µC 36. The reason is that as long as loop current i* is still flowing, induced voltage $u_{ind}$ is not measurable, i.e. time $t_3$ in FIG. 14 is the point in time after which induced voltage $u_{ind}$ becomes measurable, and time span $T_{ineu}$ is therefore determined by the difference $(t_3-t_2)$, is stored in S160, and replaces the previously saved value $T_{ialt}$, i.e.

$$T_{ineu} := T_{ialt}.$$

If an induced voltage cannot be sensed in S158, the reason may also be that a TIMEOUT has occurred. This is therefore checked in S162. It is sensed by the fact that in FIG. 14, commutation occurred only at a time C', i.e. at a point in time $t_{out}$ that is separated from time $t_2$ by an interval TIMEOUT. This is the time interval that was calculated in step S154.

If the reply in S162 is No, the routine goes back to step S158.

If the reply in S162 is Yes, this means that a time span TIMEOUT has elapsed since time $t_2$ at which current $i_1$ was switched off, but that an induced voltage $u_{ind}$ was not measured within that time span, as depicted schematically in FIG. 14 for time span 164. In such a case loop current i* is still flowing, for example because motor 20 was driven by a gust of wind, so that it was not possible to measure a point in time (analogous to time $t_4$ in FIG. 14) at which the loop current has dropped to zero.

A forced or emergency commutation occurs in this case, and since the time $T_{ON}$ that was calculated in S154 was obviously too long, it is shortened in S166 by an amount a. The routine then goes back to step S150 and is cycled through again.

What results in this context is (at 170 in FIG. 14) a signal $p_{52}$ which is shorter than the preceding signals $p_{52}$ and $p_{54}$, i.e. the current pulse that flows in FIG. 13 from 46 ($U_B$) into motor 20 is substantially shorter than the current pulses preceding it in time, and the duration of the current pulses is then gradually brought back to the optimum by means of optimization routine S112 (FIGS. 4 and 15).

When commutation is proceeding normally, step S168 in FIG. 15 checks whether induced voltage $u_{ind}$ has become zero. If No, the routine goes back to the input to S168, and this check is repeated until $u_{ind}$ has become zero. Commutation then takes place in step S170 ("Com"), and the time span $T_p$ that was just measured is stored. In this case as well, the routine goes back to S150.

During the period $T_{ON}$ in which current $i_1$ is flowing, µC 36 calculates (in step S154) the next switch-on duration $T_{ON}$ and the next time span TIMEOUT, the function of which has already been explained.

When loop current i* has reached a value of zero at time $t_3$, induced voltage 18 that is induced by rotor magnet 28 in stator winding 26 can be measured at drain 54 of MOSFET T2. This voltage is labeled $u_{ind}$ 18 in FIG. 14; it is measurable as of time $t_3$, and passes through the zero value at time $t_4$.

This is depicted schematically in FIG. 14. After commutation C1, current $i_2$ flows during the period $T_{ON2}$; and after shutoff (at time $t_2'$) an induced voltage $u_{ind}$ cannot be measured because loop current i* is flowing for too long. Once the previously calculated TIMEOUT time has elapsed, a forced commutation therefore occurs at time C2; this is, however, not optimal and represents (with some exaggeration) an emergency commutation. This is ascertained in S162, and switch-on time $T_{ON2}$ is correspondingly shortened by an amount a (S166) so that $T_{ON3}$ ends at a time $t_2''$, i.e. only a short current flows out of the DC voltage network to motor 20', so that the current to the motor can rise only a little and the subsequent loop current i* thus decays rapidly. Once loop current i* has reached a value of zero, the induced voltage can be measured; and when the latter passes through zero at time C3, commutation once again becomes normal.

If no TIMEOUT exists, the routine of FIG. 15 goes back to step S158, which checks further as to whether $$|u_{ind}|>0 \quad (9)$$

has become valid.

The time span $T_{ON}$ is therefore very short after a TIMEOUT, i.e. only a short driving current pulse flows because the time $T_{ON}$ must be reduced, for safety reasons, by a fairly large value a so that the next commutation can reliably be controlled by the zero transition of induced voltage 18.

After this short driving current pulse, induced voltage 18 (FIG. 14) can immediately be measured again, and commutation can occur at its zero transition; in other words, the sensorless motor's electronic system now once again "knows" the instantaneous position of rotor 28 and can once again optimize commutation by means of the routine in FIG. 4, by optimizing the value $T_p$.

This is possible because following step S166 of FIG. 15, the values $T_{ON}$ and $T_V$ can once again be exactly measured and stored, so that the value $T_V=T_i+T_p$ is also known and is available for commutation calculation purposes.

An examination of FIG. 14 reveals that if the value $T_{ON}$ is greatly shortened with no change in rotation speed, the time $T_i$ during which loop current i* flows will then likewise be very short, since only a little magnetic energy was stored in the motor by the short current pulse. With reference to FIG. 14, this means that times $t_2$ and $t_3$ are advanced, i.e. shifted to the left. The value $t_4$, on the other hand, remains largely unchanged, since it is identical to the zero transition of induced voltage 18.

The TIMEOUT function makes it possible to "iron out" brief disruptions, e.g. a brief change in operating voltage, without resulting in large changes in the rotation speed of motor 20.

Many variants and modifications are of course possible within the scope of the present invention. For example, in FIG. 14 the TIMEOUT time could also be calculated from time $t_0$ to time $t_{out}$, although naturally the version according to FIG. 14 is preferred. The variants depicted in FIG. 2 (capacitor 48) or in FIG. 1 (current measuring element 64) or in FIG. 9 (Z diode 90) can be used similarly in the context of the sensorless version.

What is claimed is:

1. A method of operating an electronically commutated motor (20) from a DC voltage source ($U_B$), said motor (20) having:
   a permanent-magnet rotor (28) and a stator working together therewith, which stator includes a stator winding strand (26) in which, during operation, an alternating induced voltage ($u_{ind}$) is generated by the permanent-magnet rotor (28);
   an H-bridge circuit (22) having power semiconductors (S1, S2, S3, S4), which bridge circuit (22) has an upper bridge half (38) that is connected, during operation, to the one pole (46) of the DC voltage source ($U_B$), and
   a lower bridge half (56) that is connected, during operation, to the other pole (50) of the DC voltage source ($U_B$),
   the stator winding strand (26) being arranged in the diagonal (24) of the H-bridge circuit (22) and having flowing through it, during operation, alternately a current pulse ($i_1$) in a first direction and then a successive current pulse ($i_1'$) in a direction opposite to the first direction, and there being a commutation operation between each two successive current pulses,
said method comprising the steps of:
at the beginning of a commutation operation, in a first half of said bridge circuit (22), blocking the presently conductive semiconductor switch in order to interrupt energy delivery from the DC voltage source ($U_B$) to the motor (20), so that in the other bridge half (56) a loop current (i*) flows through the stator winding strand (26), through the semiconductor switch made conductive therein, and through a recovery diode associated with the blocked semiconductor switch of said other bridge half, which loop current (i*) converts the energy stored in the magnetic circuit of the motor (20) at least partly into driving energy for the permanent-magnet rotor (28);
monitoring voltage ($u_{ind}$) induced in the stator winding strand (26) in order to obtain, at an end of the loop current (i*), a signal indicating when said end happens;
thereafter blocking the previously conductive semiconductor switch of the other bridge half, and
completing commutation by delivering a current $i_1'$ to the stator winding strand (26) from the DC voltage source ($U_B$) in a direction that is opposite to the direction of the current ($i_1$) which flowed prior to the commutation operation.

2. The method according to claim 1, further comprising using a field effect transistor (T1, T2, T3, T4) to perform at least one of said switching steps in said bridge circuit (22).

3. The method according to claim 2, further comprising using n-channel MOSFETs (T3, T4) to perform switching steps in one bridge half (56) and using p-channel MOSFETs (T1, T2) to perform switching steps in the other bridge half (38).

4. The method according to claim 1 further comprising detecting a predetermined low value of the loop current (I*), by monitoring and evaluating potential ($p_{52}$, $p_{54}$) at least one of the terminals (D) of the semiconductor switches of one bridge half (56).

5. The method according to claim 4, further comprising detecting when the value of the loop current (i*) has declined to zero.

6. The method according to claim 1, further comprising when the induced voltage ($u_{ind}$) has not been sensed within a predetermined time period ($T_V$), incrementing the duration of that time period ($T_V$) (FIG. 4: S120).

7. The method according to claim 6, wherein upon incrementing, the predetermined time period ($T_V$) is incremented in each case by a first value (b), and wherein upon decrementing, said time period ($T_V$) is decremented in each case by a second value (a), and the first value (b) is greater than the second value (a).

8. The method according to claim 1, further comprising when the induced voltage ($u_{ind}$) has been sensed within a predetermined time period ($T_V$), decrementing the duration of that time period (FIG. 4: S116).

9. The method according to claim 1, further comprising during the time span ($T_{ON}$) during which the stator winding strand (26) has a current pulse ($i_1$, $i_1'$) flowing through it, calculating a point in time for switching off the relevant current pulse ($i_1$, $i_1'$).

10. The method according to claim 1, further comprising, during the time span ($T_{ON}$) during which the stator winding strand (26) has a current pulse ($i_1$, $i_1'$) flowing through it, calculating a time span (TIMEOUT), and after the expiration of which (FIG. 14: $t_{out}$) initiating a commutation operation, provided a commutation has not already been initiated, before the expiration of said time span (TIMEOUT), by the zero transition of the voltage ($u_{ind}$) induced in the stator winding strand (26) by the rotor (28).

11. The method according to claim 10, further comprising, during the time span ($T_{ON}$) during which the stator winding (26) has a current pulse ($i_1$, $i_1'$) flowing through it, influencing a time span ($T_p$) toward a value ($T_{pmin}$) at which the time span between the time ($t_3$) at which the induced voltage ($u_{ind}$) is measurable and the time ($t_4$) of the zero transition of said voltage is kept in the vicinity of its minimum.

12. An electronically commutated motor for operation from a DC voltage source ($U_B$), which motor comprises:
a permanent-magnet rotor (28) and a stator that includes a stator winding strand (26) in which, during operation, an alternating induced voltage ($u_{ind}$) is generated by the permanent-magnet rotor (28);
an H-bridge circuit (22) having power semiconductors (T1, T2, T3, T4), which bridge circuit (22) has an upper bridge half (38) for connection to the one pole (46) of the DC voltage source ($U_B$), and
a lower bridge half (56) for connection to the other pole (50) of the DC voltage source,
which stator winding strand (26) is arranged in the diagonal (24) of the H-bridge circuit (22) and has flowing through it, during operation, alternately a current pulse ($i_1$) in a first direction and then a current pulse ($i_1'$) in a direction opposite to the first direction, there being a commutation operation between each two successive current pulses,
and having an arrangement (36) which performs the steps of:
at the beginning of a commutation operation, switching off the presently conductive semiconductor switch of the one bridge half (38) in order to interrupt energy delivery from the DC voltage source ($U_B$), so that in the other bridge half (56) a loop current ($i^*$; $-i^*$) flows through the stator winding strand (26), through the semiconductor switch made conductive therein, and through a recovery diode (58; 60) associated with the blocked semiconductor switch of said other bridge half, which loop current ($i^*$; $-i^*$) converts the energy stored in the magnetic circuit of the motor (20) at least partly into driving energy for the permanent-magnet rotor (28);
monitoring the voltage ($u_{ind}$) induced in the stator winding strand (26) in order to obtain a signal as to when the loop current ($i^*$) has assumed the predetermined low value;
thereafter blocking the previously conductive semiconductor switch of the other bridge half (56), and
completing commutation by delivering a current to the stator winding strand (26) from the DC voltage source ($U_B$) in a direction that is opposite to the direction of the current flowing prior to the commutation operation.

13. The motor according to claim 12, wherein
at least one of the semiconductor switches is implemented as a field effect transistor.

14. The motor according to claim 13, wherein
the H-bridge (22) comprises n-channel MOSFETs (T3, T4) in one bridge half (56) and p-channel MOSFETs (T1, T2) in the other bridge half (38).

15. The motor according to claim 12, further comprising
in order to sense a predetermined low value of the loop current ($i^*$; $-i^*$), monitoring a potential at at least one of the terminals of the semiconductor switches (T1, T2, T3, T4) of the H-bridge (22).

16. The motor according to claim 12, further comprising
subsequent to the flowing of the loop current ($i^*$; $-i^*$), monitoring the voltage ($u_{ind}$) that is induced by the rotating rotor (28) in the currentless stator winding (26), and
triggering commutation at an instant temporally adjacent a predetermined value of said induced voltage ($u_{ind}$).

17. The motor according to claim 16, further comprising triggering commutation adjacent a zero transition of the induced voltage ($u_{ind}$).

18. The motor according to claim 12, further comprising
when the induced voltage ($u_{ind}$) is not detected within a predetermined rotational position range, initiating a forced commutation within a predetermined time span (TIMEOUT) after current flow from the DC power network ($U_B$) to the stator winding (26) has been switched on or off.

19. The motor according to claim 12, wherein said arrangement includes a μC (36) in which, during the time span ($T_{ON}$) during which the stator winding strand (26) has a current pulse ($i_1$, $i_1'$) flowing through it, a point in time for switching off the relevant current pulse ($i_1$, $i_1'$) is calculated.

20. The motor according to claim 12,
wherein said arrangement includes a μC (36) in which, during the time span ($T_{ON}$) during which the stator winding strand (26) has a current pulse ($i_1$, $i_1'$) flowing through it, a time span (TIMEOUT) is calculated after the expiration of which (FIG. 14: $t_{out}$) the beginning of a commutation operation is initiated provided a commutation has not already been initiated, even before the expiration of said time span (TIMEOUT), by the zero transition of the voltage ($u_{ind}$) induced in the stator winding strand (26) by the rotor (28).

21. The motor according to claim 12,
wherein said arrangement comprises a μC (36) in which, during the time span during which the stator winding (26) has a current pulse ($i_1$, $i_1'$) flowing through it, a time span ($T_p$) is optimized to a value ($T_{pmin}$) at which the distance in time between the time at which the induced voltage ($u_{ind}$) is measurable and the time of the zero transition of said voltage is kept in the vicinity of a minimum.

22. The motor according to claim 12, further comprising a link circuit capacitor (48) which buffers current fluctuations which occur during commutation steps.

23. The motor according to claim 12, further comprising a Zener diode (90) associated with said motor for limiting the voltage at the DC link circuit ($U_B$).

24. The motor according to claim 12, further comprising a rotor position sensor (30) associated with said motor for controlling at least a part of the commutation operation.

25. The motor according to claim 24, wherein
the rotor position sensor (30) is arranged so that its output signal (HALL) enables control of the beginning of the current ($i_1$; $i_1'$) in semiconductors of the H-bridge (22) that are to be switched on.

26. The motor according to claim 24 or 25, wherein
the rotor position sensor (30) is circumferentially offset out of a neutral zone of the motor (20), opposite to the rotation direction, in order to produce a so-called ignition advance.

* * * * *